United States Patent [19]

Pruncutz

[11] 4,081,923

[45] Apr. 4, 1978

[54] FISH HOOK HOLDER

[76] Inventor: T. John Pruncutz, 6550 SW. 52nd Ter., Miami, Fla. 33155

[21] Appl. No.: 718,554

[22] Filed: Aug. 30, 1976

[51] Int. Cl.$^2$ .............................................. A01K 97/06
[52] U.S. Cl. .................................... 43/57.5 R; 43/25.2
[58] Field of Search .................... 43/1, 4, 42.1, 42.41, 43/42.2, 57.5, 25.1, 25.2

[56] References Cited

U.S. PATENT DOCUMENTS

| 2,849,825 | 9/1958 | Reisner | 43/25.2 |
| 3,800,456 | 4/1974 | Rowe | 43/57.5 R |

FOREIGN PATENT DOCUMENTS

| 580,212 | 7/1959 | Canada | 43/57.5 R |
| 1,199,376 | 6/1959 | France | 43/1 |

Primary Examiner—Hugh R. Chamblee
Attorney, Agent, or Firm—Malin & Haley

[57] ABSTRACT

A fish hook holder for safely retaining a fish hook, while threading and securing a line or leader manually to the hook eye. The device includes an elongated, somewhat rigid, bifurcated body having a hollow, internal chamber, a plurality of rigid, hook engaging pins fastened laterally to said bifurcated body sections through said hollow chamber, said body having a closed fixed end and a slotted end formed by the bifurcated arms, the end slot including planar surface engaged walls in flush contact, the walls being parallel to the longitudinal axis of the body. A fish hook is engaged to a particular lateral pin inside the arcuate portion of the hook, while the shaft or shank of the hook is firmly held, positioned resiliently by the slotted, planar wall surfaces. The closed body end includes an aperture for receiving a removable fastener which allows the device to be attached to a fixed object or a person's apparel such as a belt which allows the operator's hand to be free to allow attachment of the line or leader to the hook and anchor the device to resist heavy longitudinal tension applied to the line or leader when pulling the knot tight.

3 Claims, 4 Drawing Figures

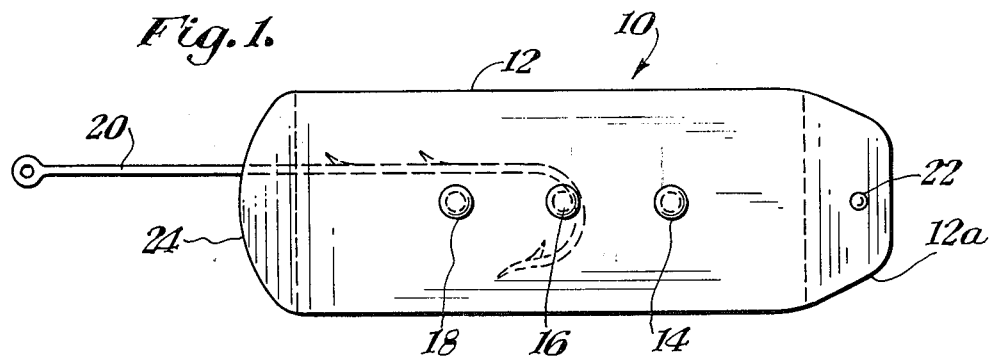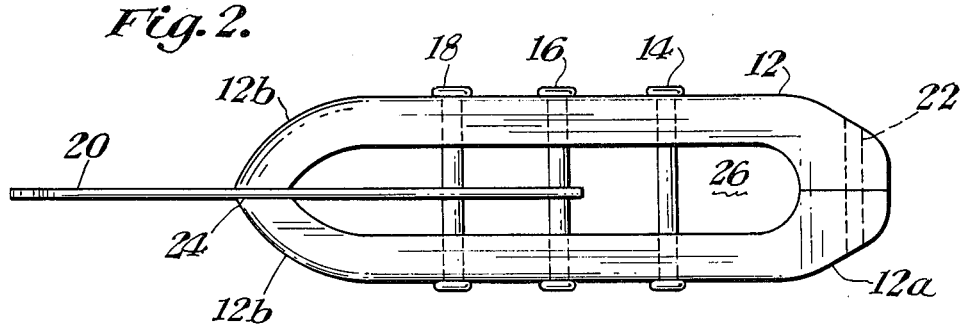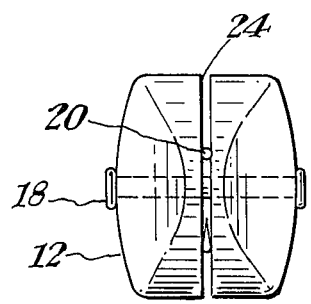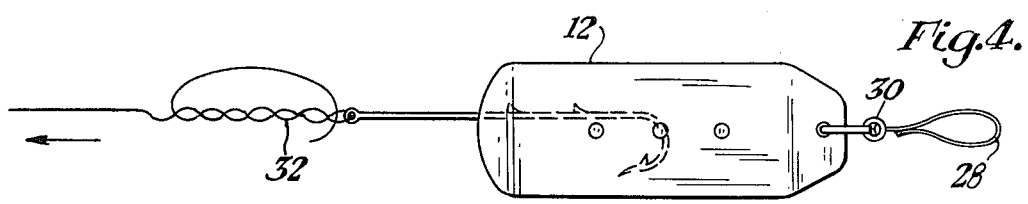

FISH HOOK HOLDER

BACKGROUND OF THE INVENTION

This invention relates generally to a fish hook holder, and specifically to a fish hook holder that protects an operator's hand from the fish hook barbs while attaching a line or leader to the eye of the hook. The device also protects delicate artificial flies secured to hooks from damage by the operator's hands.

While fishing, it is oftentimes necessary to affix a fish hook to a line or leader by tying the line or leader to the fish hook eye. Because of the small size of most fish hooks, it requires dexterity to manually grasp and hold the fish hook while trying to thread and securely tie the leader to the hook eye. To fasten the knot, a heavy pull on the line against the hook is necessary. The fish hook barb is usually quite sharp and many hooks have additional barbs incorporated in the shank of the hook, any of which can cause serious injury to the fingers on one grasping the hook during this operation. In order to relieve the amount of dexterity required and offer resistance to longitudinal tension it is desirable to have the hook anchored while threading the hook eye and pulling the knot tight.

The instant invention solves the above stated problems in that it provides a sturdy fish hook receptacle which allows a hook to be easily placed within the hook holder body, allows for hooks of varying sizes and shapes to be threaded and tied, and provides an attachment which may be utilized with a fixed object or with a person's apparel to free the hand of the operator so that both hands may be used in the threading and tying operation and securely anchor the hook containing receptacle to resist longitudinal tensioning when securing a knot in the line. The device is constructed so that although the hook may be easily installed or removed from the hook holder body when in position and engaged within the body, it is firmly held between resilient bifurcated wall portions of the body member, safely protecting the user from the hook barbs.

BRIEF DESCRIPTION OF THE INVENTION

A fish hook holder for safely retaining a fish hook to allow the threading and tying of a line or leader through the hook eye comprising a bifurcated elongated body, the bifurcated body arms forming an internal chamber, a plurality of rigid pins spaced apart and fixed laterally to said body, attaching said bifurcated arms together, the pins being disposed through said hollow chamber. The base end of the body which may be of unitary construction includes an aperture for receiving a swivelling fastening means, such as a snap and swivel which may be utilized to attach the fish hook holder to a person's belt for supporting and anchoring the holder when in operation. The opposite, bifurcated body end provides a pair of planar flushly engaged wall surfaces forming a slot which is used to engage the shank of the hook to resiliently but firmly retain it within the body chamber of the device. The planar surfaces of the end slot walls (in one embodiment) are disposed parallel to and are within the longitudinal planar axis of the body itself. A plurality of pins are disposed laterally across the bifurcated body arms and are placed side by side perpendicular to the longitudinal axis of the body such that each pin may accommodate hooks of varying length within the holder. The lateral width of the body chamber accomodates fish hooks of varying shapes.

To operate the device, the barbed, arcuate segment of the hook is inserted into the hollow chamber (from either the top or bottom) engaging a lateral pin, while moving the shank of the hook between the end faces of the bifurcated arms until the hook is held firmly in position. The fastening means attached through the aperture in the fixed body end may then be attached to a pylon, dock, wall, boat, or person's apparel such as a belt to firmly support one end of the device, freeing the hands for threading line or leader through the hook eye, twisting the hook and leader for forming a knot in the leader, and resisting longitudinal tension on the hook and line when securing the knot with a taut pull on the line. The laterally disposed pins act to firmly hold the bifurcated arms together increasing the resilient force between the slot forming wall faces, but more importantly, curtail longitudinal movement of the hook while pulling on said threaded fish line or leader to tighten the knot. The body itself may be made of a plastic material in a unitary construction or may be comprised of two halves of materials affixed together at the base end. The device may be fabricated from any of a number of materials that would retain their resilience and are resistive to corrosion or other environmental effects in a marine environment, thus assuring a longer life to the said device. The fastening device also allows the device with hook encased to be attached to a reel or rod while transporting the fishing equipment. Artificial bait such as delicate flies may be protected by encasement in the device.

It is an object of this invention to provide an improved fish hook holder which firmly and safely retains a fish hook to allow the fisherman to readily attach and tie a line or leader through the hook eye.

It is another object of this invention to provide an improved fish hook holder that allows for the utilization of varying sized hooks and the attachment of the holder to a fixed object to free the hands for the threading and knot tying operation.

It is yet another object of this invention to provide an improved fish hook holder that allows for the utilization of varying covered hooks which coverings are necessarily of delicate structure and represent various bugs and other insects' bodies commonly called flies and to protect these bodies from physical damage while attaching to a fish line or leader.

But yet still another object of this invention is to provide a fish hook holder that may be economically fabricated, that firmly holds a fish hook in position for safely protecting manual tying to a fish hook eye protecting the hands from the fish hook barbs.

In accordance with these and other objects which will be apparent hereinafter, the instant invention will now be described with particular reference to the accompanying drawings.

BRIEF DESCRIPTION OF THE DRAWINGS

FIG. 1 shows a side elevational view showing the instant invention with a fish hook engaged therein.

FIG. 2 shows a top plan view of the instant invention.

FIG. 3 shows a front elevational view looking towards the slotted end of the instant invention.

FIG. 4 shows a side elevational view of the instant invention including a swivel fastening means, showing a conventional knot tying operation.

PREFERRED EMBODIMENT OF THE INVENTION

Referring now to the drawings and specifically FIG. 1, the instant invention is shown generally at 10 comprised of a resilient, elongated body 12 having a plurality of rigid, lateral pins 14, 16 and 18 affixed laterally through the body, firmly holding the bifurcated body arms 12b (FIG. 2) resiliently together, the parallel end faces of the bifurcated arms 12b terminating in an end slot 24. The body 12 also includes an opposite closed end 12a having an aperture 22 disposed therethrough for receiving a fastening means. The bifurcated arms 12b of body 12 enclose a hollow inner chamber 26 through which pins 14, 16 and 18 are laterally received. The hollow chamber 26 in body 12 allows a hook 20 (or an artificial fly, not shown) to be received into the body chamber and to be fastened around its arcuate portion adjacent the hook barb to any one of the pins 14, 16 or 18. The chamber width accomodates non-planar shaped hooks. The particular number of pins may be varied but the disposition of the pins along the longitudinal axis and spaced from slot 24 allow for the accommodation of fish hooks of varying sizes, having shanks of different lengths.

As shown in FIG. 2 the bifurcated body arms 12b terminate in a pair of surface walls forming slot 24, the planar wall surfaces firmly engaging the hook shank of hook 20 between the wall surfaces. The wall surfaces as shown are parallel to the longitudinal axis of the device and the wall surfaces along the longitudinal direction are elongated (equal to the thickness of the bifurcated arms) to provide more surface holding force on the fish hook shank.

FIG. 3 shows the slot 24 firmly engaging the fish hook shank 20 along the slotted end.

As shown in FIG. 1, the fish hook 20 is ready to be threaded and tied with a line or leader as it is firmly held in position by the lateral pin 16 which is sized in length to hold the resilient walls 12b firmly together across slot 24. To remove the hook, the hook shank need merely be rotated upwardly or downwardly to free the hook shank from the resilient force of the bifurcated arms along slot 24, while at the same time the arcuate portion of the hook is moved towards the closed end to free it from the hollow chamber 26.

The body of the device may be constructed of a firm, somewhat resilient plastic or other non-corrosive material and may be (as shown in FIG. 2) constructed in a unitary single piece. It could also be constructed in two separate pieces adhesively affixed at the closed end 12a forming the bifurcated arms. The fastening pins 14, 16 and 18 may be constructed of any rigid material such a metal or the like with enlarged rivet-like heads attaching it firmly through the body walls 12b.

The body aperture 22 may receive a conventional fastening device such as a snap and swivel which will allow the device to be attached to the belt or belt loop of the fisherman and rotated during the knot tying operation. This snap may also be secured to a fixed object such as a post, dock, boat or other rigid surface such that the end 12a will be firmly supported, freeing one hand of the operator so that both hands may be devoted to the threading operation.

One of the most important structural features of the invention is the capability of the hook engaging pins and body walls to withstand large longitudinal tensioning forces experienced on the hook when securing the knot in the line or leader by pulling the line or leader very taut relative to the hook eye. FIG. 4 shows a belt connector snap 28 and swivel 30 connected to the holder body 12 with a hook partially tied. The force arrow represents the direction of pull on the device when securing the knot. The snap 28 firmly anchors the holder body 12 to a belt or other rigid device (not shown). The swivel 30 allows the line or leader 32 to be twisted to aid in forming the knot.

The instant invention has been shown and described herein in what is considered to be the most practical and preferred embodiment. It is recognized however, that departures may be made therefrom within the scope of the invention and that obvious modifications will occur to a person skilled in the art.

What I claim is:

1. An improved fish hook holder for retaining a fish hook while protecting the manual threading and affixing of a line or leader to a hook comprising:

an elongated resilient body, said body having a hollow interior chamber, said body including a pair of resilient separable bifurcated arms forming a slotted surface at one end of said body, said surface slot being smaller than the diameter of a fish hook body and forming a closed surface at the opposite end of said body;

said bifurcated body arms form a slot with a pair of parallel, planar wall surfaces having a longitudinal length equal to the thickness of the bifurcated arms, said wall surfaces being disposed in the longitudinal axis of said body; and a plurality of rigid pins spaced apart longitudinally, laterally coupling said bifurcated arms together whereby said pins may accommodate and are spaced at different distances from said slotted end to accommodate fish hooks of varying lengths.

2. An improved fish hook holder as in claim 1, including:

said body having an aperture means disposed at said closed end for affixing an anchoring means to said body.

3. An improved fish hook holder as in claim 2 including:

anchoring means connected to said body through said body aperture; and body swivel means connected to said anchoring means and said body, whereby said body may be rotated relative to said anchoring means.

* * * * *